Dec. 24, 1935.  W. N. GOODWIN, JR  2,025,163

TUBE TESTER

Filed Feb. 8, 1933

Inventor:
William Nelson Goodwin, Jr.
By Byrnes Townsend & Potter,
Attorneys.

Patented Dec. 24, 1935

2,025,163

UNITED STATES PATENT OFFICE 2,025,163

TUBE TESTER

William Nelson Goodwin, Jr., Newark, N. J., assignor to Weston Electrical Instrument Corporation, Newark, N. J., a corporation of New Jersey Application February 8, 1933, Serial No. 655,819

11 Claims. (Cl. 250—27)

This invention relates to a tube tester device and more particularly to a device for use in testing the quality of vacuum tubes of the various types commonly employed in radio receivers.

Many testers have been made and used which, for cheapness and simplicity, have been so designed as to apply alternating voltages to the plate, filament and grid instead of the usual direct current voltages, and the voltage applied to the plate is the same for all types of tubes regardless of their normal operating voltages. The quality of the tube is indicated by the change in plate current for a given change in grid voltage. This type of tester is at best only a means of comparing tubes with known good or known poor tubes, but under abnormal voltage conditions, and the results obtained are not necessarily the same as would result if tested under the proper voltage conditions.

An object of the present invention is to provide a testing device of the type stated and in which the voltages applied to the tube shall be the direct and alternating current voltages for the particular tube tested, as designated by the manufacturer and as used in practice. A further object of the invention is to provide a testing device in which the correct application of the proper voltages is effected by a very simple and automatic operation. A further object is to provide a testing device for measuring the value of tubes of different types on a basis of the mutual conductance of the particular tube, and with the tube subjected to its normal operating voltages.

More particularly, an object is to provide a tube testing device including a plurality of sockets for receiving tubes of different types, a single measuring instrument for indicating the value of the tube under test, and switch means operated automatically by the introduction of a tube into its proper socket for transferring the measuring system to the plate circuit of that particular socket.

Figure 1:
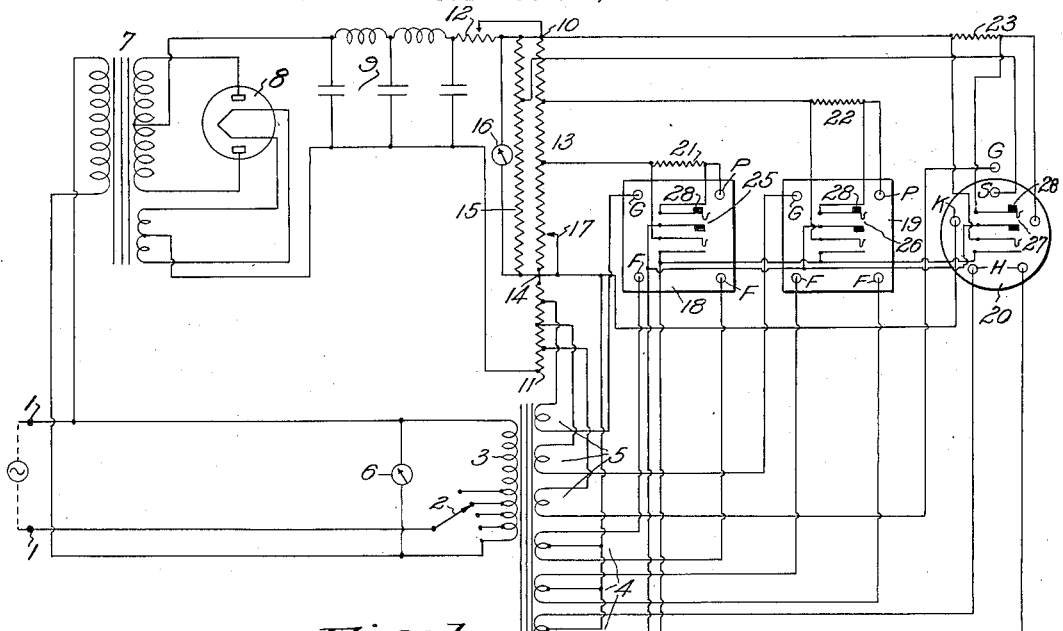
Figure 2:
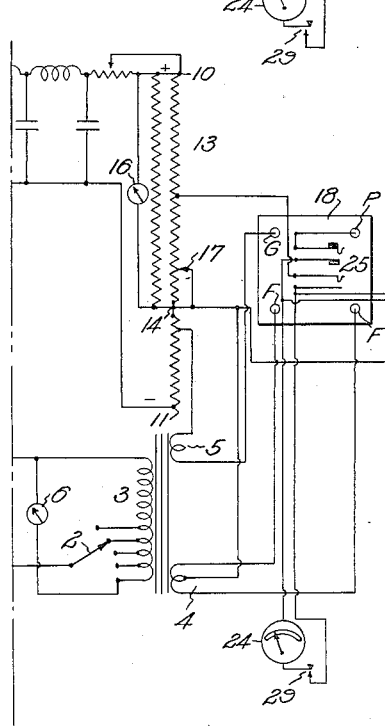

These and other objects and advantages of the invention will be apparent from the following specification, when taken with the accompanying drawing, in which, Fig. 1 is a circuit diagram of a tube testing device embodying the invention, and Fig. 2 is a fragmentary circuit diagram illustrating another embodiment thereof.

The circuits to be described fall into two general groups; one being the testing circuits for automatically applying the proper energizing voltages, from constant voltage sources, to tubes of different types, and the other group being designed to supply the testing circuits with constant and predetermined voltages from a source of variable potential. This second group of circuit elements will, of course, be unnecessary when batteries or other constant-voltage sources are available but, for simplicity and economy, it is preferable to energize the testing device from the usual alternating current power or light lines.

Considering first the power supply unit for the operation of the testing circuits, the reference numeral 1 identifies the terminals for connecting the device to an appropriate alternating current source which may be the customary 60 cycle light and power line. The terminals 1 are connected to one end of and to the switch arm 2, respectively, of the tapped primary winding 3 of a transformer having a plurality of secondary windings 4 for supplying cathode heater currents of different voltages and secondary windings 5 for supplying signal voltages of different magnitudes. A voltmeter 6 is connected across the extremities of the primary winding 3 and it will be apparent that the switch arm 2 may be adjusted, in accordance with the power line voltage when the test is made, to provide a constant predetermined voltage across the primary winding.

The direct current voltages for application to the grid and plate terminals of the tube are obtained by rectification of the output voltage of a step-up transformer 7 which has the primary winding thereof connected in parallel with the primary 3 of the cathode heater transformer, the secondary windings of transformer 7 being of the customary type for energizing a rectifier tube 8 of the 280 type (or two tubes of the 281 type). The rectified output current is passed through a filter network 9 to the direct current output terminals 10, 11 and an adjustable resistance 12 is included between the filter 9 and positive terminal 10 to permit adjustment for slow changes in the resistance of the rectifier tube or tubes. A resistor or voltage divider 13 is connected between the output terminals 10, 11 and an intermediate point 14 on the resistor 13 is connected to the midpoints of the several cathode heater windings 4. A second voltage divider 15 and a voltmeter 16 are connected in parallel between the positive terminal 10 and the cathode or ground point 14 of the resistor 13. A tap 17 is connected to point 14 and adjustable along the resistor 13, thereby permitting adjustment of the direct current voltage between points 10 and 14 to a definite predetermined value.

The current flow through the upper portion of resistor 13 provides a potential drop for supplying desired plate voltages of different magnitudes, and current flow through resistor 15 similarly provides desired screen grid voltages. The total current flow through these resistors passes through the grid bias resistor which is constituted by the lower portion of resistor 13, i. e., the section between the ground point 14 and the negative terminal 11 of the filter network. The resistors are so chosen that the current flow is large in comparison to the variations in plate current and therefore the grid bias voltages are, for all practical purposes, correct and constant so long as voltmeter 16 indicates the predetermined voltage across the plate and screen grid resistors. This is an important feature of the invention as it permits simultaneous adjustment of the plate, grid and screen voltages to their correct value by a single adjustment, and the correct adjustment for all types of tubes is indicated when the pointer of voltmeter 16 stands at a single, predetermined point.

For convenience and rapidity of adjustment, the voltmeters 6 and 16 are preferably provided, respectively, with a single and with two calibration marks in place of complete scales.

One terminal of each of the signal voltage windings 5 is connected to a point on the grid bias section of resistor 13 to provide appropriate direct current potentials for application to the grids of tubes of different types.

The testing section of the device includes a tube socket for each different type of tube which is to be tested and, for purposes of illustration, three tube sockets are shown.

The tube sockets 18, 19 are adapted to receive three electrode tubes of the filamentary type, and socket 20 is designed for a tetrode of the separate heater type. Connections are made from the filament terminals F or the heater terminals H of the respective sockets to the heater windings 4 which are designed to supply the heating current appropriate for the different tube types when the voltage across the primary winding 3 is adjusted to its predetermined value. Similarly, connections extend from the control grid terminals G of the sockets to the appropriate signal voltage windings 5, and from the screen grid terminal S of the socket 20 to the voltage divider 15.

The leads from the plate terminals P of the several sockets to appropriate points on the voltage divider 13 include resistances 21, 22, 23, respectively, whose magnitudes are so related that the flow of plate current, of signal frequency, which corresponds to the rated or normal mutual conductance of a particular tube will establish a voltage drop across its associated resistance which is substantially the same as the voltage drop established across the other resistances when tubes having the normal mutual conductance of their particular types are inserted in the appropriate sockets. With this arrangement, the merit of all types of tubes may be indicated by a single instrument and upon a single scale by connecting the instrument across the terminals of the resistance in the path of plate current flow.

As indicated diagrammatically in Fig. 1, the instrument 24 may be most conveniently connected across the appropriate resistance by means of double-pole, open-circuit jacks 25, 26, 27, which are so mounted beneath or adjacent the tube sockets, 18, 19, 20 respectively, that the insertion of a tube into a socket automatically depresses the actuating button or lug 28 of the particular jack to close the pair of contacts. The common leads from all of the jacks to the measuring instrument 24 include a switch 29, preferably of the push-button type, for closing the instrument circuit only when a reading is made.

After placing a tube in its appropriate socket, say socket 18, and thus automatically operating the jack 25 to connect the leads from instrument 24 across the plate circuit resistor 21 of socket 18, the switch arm 2 of the transformer winding 3, and then the adjustable contact of the variable resistance 17, are adjusted, if necessary, to obtain the predetermined voltage indications at the instruments 6 and 16, respectively. The additional adjustment, variable resistance 12, is provided to compensate for slow changes in the resistance of the rectifier and this adjustment should be checked at intervals, say once a day. The proper adjustment is made by varying the tap on resistance 12 to bring the pointer of voltmeter 16 to a fixed calibrated mark (different from that used in the actual tube testing) when no tubes are inserted in the sockets.

Assuming that resistance 12 was properly adjusted at some recent time, and that the adjustments made after insertion of a tube give the proper readings on voltmeters 6 and 16, the proper filament, grid and plate voltages are established on the tube elements, and a signal voltage of predetermined value is impressed on the tube input circuit. The current, of signal frequency, generated in the plate circuit is therefore a measure of the mutual conductance of the tube under normal operating conditions, and an indication of its value appears at instrument 24 when the switch 29 is closed. While the direct current component of the signal frequency may be excluded from the measuring circuits, it is more convenient to employ an instrument 24 which passes the direct current component, but which measures only the alternating component resulting from the grid input signal voltage. The instrument may therefore be of the shunted rectifier type, or it may be an electrodynamometer type with a separately excited field.

As tubes of different types have mutual conductance values which differ materially in magnitude, the scale of instrument 24 is not graduated in actual values of mutual conductance, but in percentage values or, preferably, in zones of different color which carry appropriate legends such as "Good", "Doubtful" and "Poor". By appropriate choice of the several resistances 21, 22, 23, which are shunted across the instrument, the corresponding relative values for all types of tubes may be brought to the same point on the scale.

It will be apparent, however, that the actual value of the mutual conductance for any type of tube may be read, directly in micromhos, from a single scale or instrument 24 if the resistances 21, 22, etc. are all of the same magnitude, or a single instrument could be permanently inserted in the common portion of the cathode leads from all tubes, i. e., adjacent the point 14, but this latter arrangement will give erroneous readings in the case of screen grid tubes unless the impressed signal voltage is made high enough to dwarf the flow of screen grid current in the cathode circuit.

Another arrangement for measuring the absolute value of the mutual conductance is shown in the fragmentary diagram, Fig. 2. The circuit arrangements are, or may be, identical with those previously described and corresponding parts are identified by the same reference numerals. The only essential difference between this embodiment and the one previously described is found in the complete absence of the shunt resistors from the plate circuits of the several tube sockets, and therefore a repetition of the foregoing description of the particular circuit arrangement is believed to be unnecessary.

It will be apparent that the invention provides a simple apparatus for the testing of tubes of different types, the test affording a true indication of the mutual conductance of the tube under normal operating conditions.

I claim:

1. In tube testing apparatus, a plurality of tube sockets each adapted to receive a tube of one given type, means for applying signal and energizing potentials upon the terminals of each socket, a single measuring instrument for measuring the alternating plate current flow established when a tube is inserted in one of said sockets, said instrument being normally disconnected from all of said sockets, and means including switch mechanism associated with each socket for introducing said instrument into the plate circuit of any one of said sockets, each switch mechanism including means engageable by a tube on the insertion thereof into the associated socket for actuating the switch mechanism.

2. The invention as set forth in claim 1, wherein said last means includes a series resistance in the plate circuit of each socket, and switch mechanism operated by the introduction of a tube into a socket connects said measuring instrument across the resistance associated with the socket in which the tube is introduced.

3. In tube testing apparatus, the combination with a plurality of tube sockets each adapted to receive a tube of one given type, and a circuit network including sources of signal and energizing current supply connected to the respective sockets, said network including a series resistance in each of the plate circuits of the several sockets, of a measuring instrument having a single scale, and switch means operable mechanically by the insertion of a tube into a socket to introduce said instrument into the plate circuit of the said socket.

4. The invention as set forth in claim 3, wherein the insertion of a tube into a socket actuates said switch means to connect said instrument across the series resistance in the plate circuit of said socket.

5. The invention as set forth in claim 3, wherein the insertion of a tube into a socket actuates said switch means to connect said instrument across the series resistance in the plate circuit of the said socket, the resistances of the several plate circuits having such relative values that tubes of different types but of the same relative merit produce substantially identical indications at said measuring instrument.

6. In apparatus for testing tubes of a plurality of types, the combination with a plurality of tube sockets, means for impressing on the terminals of the respective sockets energizing potentials corresponding to the normal operating potentials for the type of tube to be received by the particular sockets, and means for impressing an alternating signal voltage across the input terminals of the several sockets, of a single instrument for measuring alternating current, and means automatically including said instrument in the plate circuit of a socket when a tube is inserted therein, said last means including a switch associated with each socket and having an operating member to be actuated by a tube inserted in the tube with which the particular switch is associated.

7. In a tube tester, the combination with a plurality of tube sockets, a measuring instrument, and means for introducing said instrument into the plate circuit of one of said sockets, of a rectifier and a filter network for energizing the plate circuit from a source of alternating current, means adjustable to compensate for variations in the voltage of said source, and means to compensate for variations in the conductivity of said rectifier.

8. Apparatus for the testing of tubes of different types and including a plurality of tube sockets, and means energized from an alternating current source for applying to the elements of each socket the potentials corresponding to normal operation of the particular types of tubes to be inserted in the several sockets, characterized by the fact that said potential applying means includes a resistive voltage divider, connections from the terminals of the sockets to spaced points on said voltage divider, and means for establishing a direct current flow through said voltage divider of such magnitude that the potential drop across the same is substantially independent of the current flow in any circuit that may be completed by the insertion of a tube in one of said sockets.

9. The invention as set forth in claim 8, wherein said voltage divider comprises a pair of resistances connected in parallel with each other and in series with a common resistance, the connections from the plate circuit terminals of said sockets being made to one of said parallel resistances, the connections from the screen grid terminal of a tetrode socket being made to the second parallel resistance, and the connections to the grid circuit terminals of said sockets being made to said third resistance, the common junction of said resistance being connected to the cathode terminals of all of said sockets.

10. In apparatus for testing tubes of different types, the combination with a plurality of tube sockets, of a circuit network including means for impressing upon the terminals of each tube socket the alternating and direct current potentials corresponding to normal operation of the respective tubes to be inserted in said sockets; said means comprising a voltage-dividing resistance, connections from the electrode terminals of the several sockets to spaced points on said resistance, and means for passing through said resistance a direct current of such magnitude that the flow of plate current established when a tube is inserted in one of said sockets does not substantially alter the voltages impressed on the said connections by current flow through said resistance; and means for indicating the plate current flow established when a tube is inserted in one of said sockets; said last means including a single measuring instrument having a pair of leads of which one is normally disconnected from said network, and switch means operable by the insertion of a tube in any given socket for connecting said instrument leads into the plate circuit of the given socket.

11. In apparatus for testing tubes of different types, the combination with a tube socket for each type of tube, and means for indicating the plate current flow when a tube is inserted in its appropriate socket, of means for applying to the terminals of each socket the potentials corresponding to normal operation of the tube to be inserted in the respective sockets, said voltage applying means including terminals for connection to a source of alternating current, a transformer having a tapped primary and a plurality of secondaries for supplying current for heating the cathodes of the several types of tubes, a single voltmeter for indicating when the tapped primary is adjusted to establish normal potentials in each of said secondaries, a rectifier for applying direct current potentials to the terminals of the several sockets, a voltage-divider resistance through which direct current is passed by said rectifier, a voltmeter connected across a part of said resistance, connections from the said socket terminals to said resistance, and adjustable means to compensate for variations in the resistance of said rectifier, thereby to maintain a constant current flow in said resistance in spite of variations in the resistance of said rectifier.

WILLIAM NELSON GOODWIN, Jr.